US 8,780,695 B2

(12) United States Patent
Grosso

(10) Patent No.: US 8,780,695 B2
(45) Date of Patent: Jul. 15, 2014

(54) DEVICE AND SYSTEM FOR PROTECTION SWITCHING

(75) Inventor: Renato Grosso, Genoa (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 275 days.

(21) Appl. No.: 13/125,614

(22) PCT Filed: Oct. 23, 2008

(86) PCT No.: PCT/SE2008/051200
§ 371 (c)(1),
(2), (4) Date: Aug. 3, 2011

(87) PCT Pub. No.: WO2010/047629
PCT Pub. Date: Apr. 29, 2010

(65) Prior Publication Data
US 2011/0286323 A1    Nov. 24, 2011

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC .......................................... 370/217; 714/4.2

(58) Field of Classification Search
None
See application file for complete search history.

(56) References Cited

U.S. PATENT DOCUMENTS

| 4,998,240 | A | * | 3/1991 | Williams | 370/251 |
| 5,189,663 | A | * | 2/1993 | Williams | 370/251 |
| 6,260,155 | B1 | * | 7/2001 | Dellacona | 714/4.2 |
| 6,433,988 | B1 | | 8/2002 | Lowe et al. | |
| 6,529,599 | B1 | | 3/2003 | Gorshe | |
| 6,865,693 | B1 | * | 3/2005 | McAfee | 714/27 |
| 7,003,690 | B2 | * | 2/2006 | Liva et al. | 714/4.2 |
| 7,983,641 | B2 | * | 7/2011 | Kudo et al. | 455/234.2 |
| 2002/0179720 | A1 | * | 12/2002 | Liva et al. | 235/492 |
| 2004/0078620 | A1 | | 4/2004 | Harel et al. | |
| 2004/0114510 | A1 | | 6/2004 | Miller et al. | |
| 2005/0232143 | A1 | | 10/2005 | Halliday et al. | |
| 2006/0050631 | A1 | | 3/2006 | Baker et al. | |

(Continued)

FOREIGN PATENT DOCUMENTS

EP    1578167 A1    9/2005
EP    1885153 A1    2/2008

OTHER PUBLICATIONS

International Preliminary Report on Patentability, PCT Application No. PCT/SE2008/051200, Oct. 13, 2010 (11 pages).

(Continued)

*Primary Examiner* — Suk Jin Kang
(74) *Attorney, Agent, or Firm* — Myers Bigel Sibley & Sajovec, PA

(57) ABSTRACT

A unit and a system for protection switching of line cards in a telecommunication system are described. A protection unit is connectable between communication lines and a line interface unit. The protection unit can be interconnected with other protection units to form a protection switching system. One protection unit in the protection switching system is connectable to a stand-by line card. The protection switching system is configured so that when protection switching is needed, the line signal is re-directed between the communication line for a failed line card and the stand-by line card via electrical connection elements.

11 Claims, 8 Drawing Sheets

(56) References Cited

U.S. PATENT DOCUMENTS

2007/0088995 A1* 4/2007 Tsern et al. .................. 714/724
2008/0247319 A1* 10/2008 Roos et al. .................... 370/241

OTHER PUBLICATIONS

Written Opinion of the International Searching Authority, PCT Application No. PCT/SE2008/051200, Jun. 25, 2009 (13 pages).

* cited by examiner

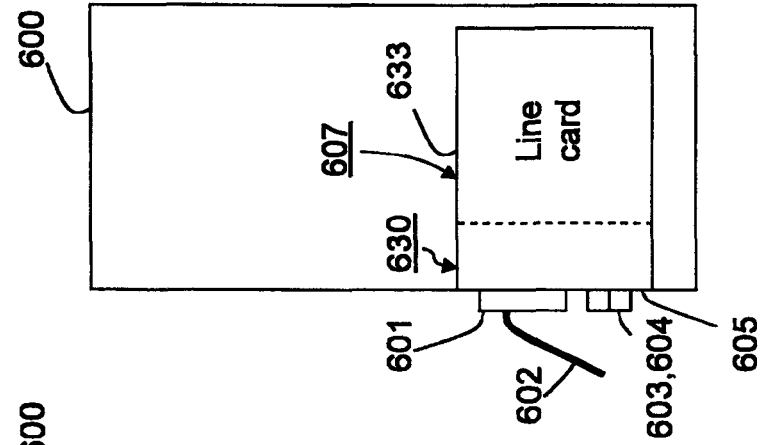
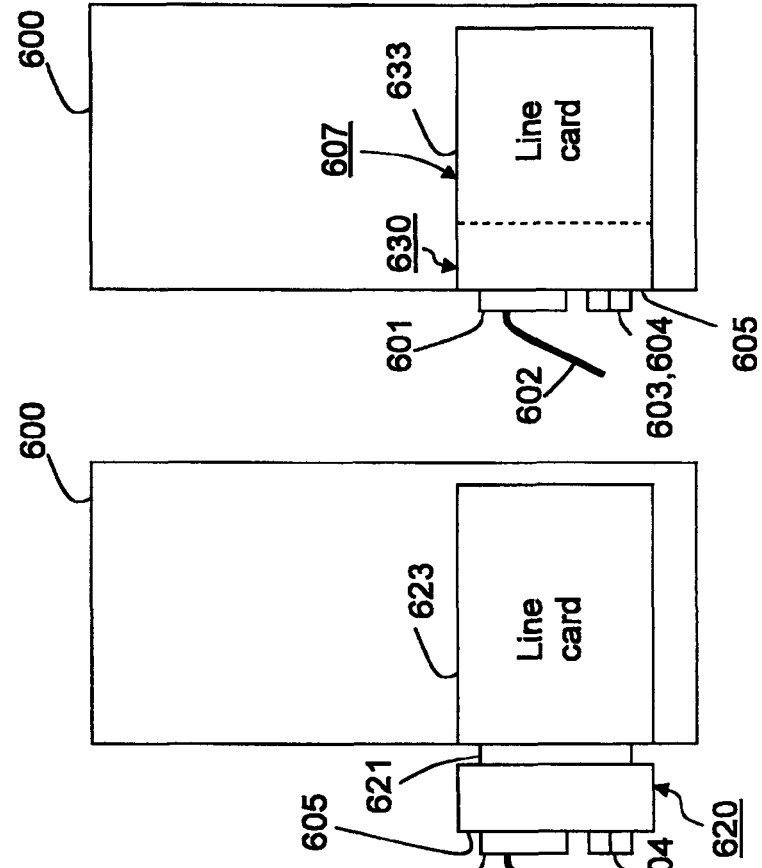
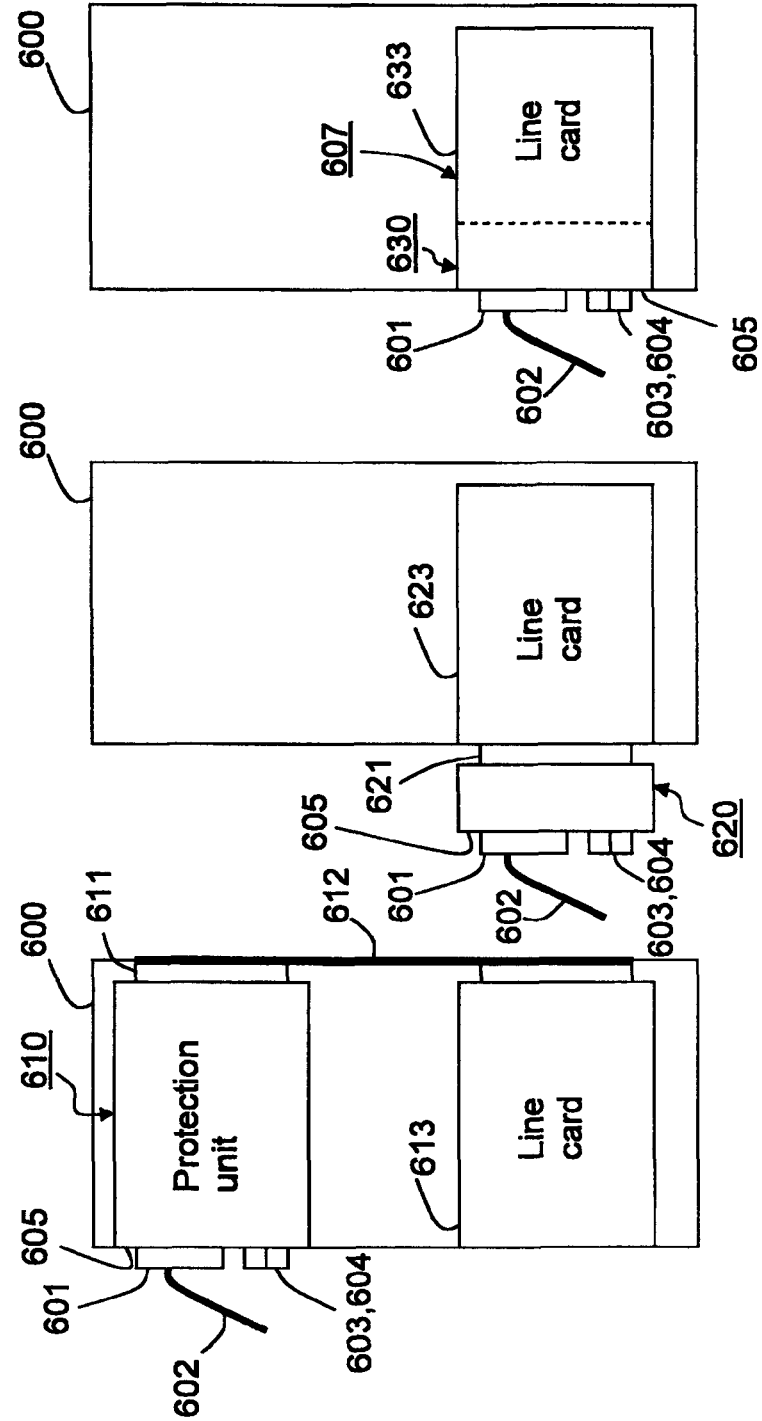

DEVICE AND SYSTEM FOR PROTECTION SWITCHING

CROSS REFERENCE TO RELATED APPLICATION

This application is a 35 U.S.C. §371 national stage application of PCT International Application No. PCT/SE2008/051200, filed on 23 Oct. 2008, the disclosure of which is incorporated by reference herein in its entirety. The above-referenced PCT International Application was published in the English language as International Publication No. WO 2010/047629 A1 on 29 Apr. 2010.

TECHNICAL FIELD OF THE INVENTION

The present invention relates to a unit and a system for protection switching for line interface units in a telecommunication system.

DESCRIPTION OF RELATED ART

In telecommunication systems such as switches or routers that have any type of communication line connected, it is important that the line interface units (or with a simpler term, line cards) interfacing the communication lines with the switches or routers work properly. If a line card fails, terminals or other telecommunication systems can not communicate with the switch or router. A known method to cope with such a problem and to provide a more reliable telecommunication system is to use protection switching.

At protection switching the line signals between the communication line and the failed line card are redirected to a stand-by line card. There can be different configurations for protection switching in a system. For example, in 1+1 protection switching there is a corresponding standby line card for each working line card. In N+1 protection switching there is one common standby line card for N working line cards.

An implementation for protection switching known from prior art is to use a fixed bus, a protection bus, in the backplane of the cabinet housing the line cards. The protection bus is shared by all line cards. This has the disadvantage that it is not possible to protect a second faulty line card if protection switching already has been performed for a first faulty line card. Another disadvantage is that line cards such as 2 Mb/s E1 line cards can not be protected at all. A common protection bus introduces severe bridge taps which for example the HDB3 line coding in the E1 line signals does not tolerate. Yet another disadvantage is that the standby line card often needs to be of a different design than the other line cards.

An example on a protection bus is disclosed in patent application US2004/0114510. This application relates to a multiplexer/de-multiplexer having one main bus and one protection bus.

SUMMARY OF THE INVENTION

The disadvantages listed above are overcome by the current invention. The current invention comprises a protection unit that is adapted to be connected between the communication line and the line card. Several protection units can be connected together to form a protection switching system. For this, the protection unit comprises a local bridge connector that is adapted to be connected to corresponding bridge connectors in other protection units. Each protection unit in the protection switching system is connected to at least one other (e.g. adjacent) protection unit by detachable electrical connection elements via the bridge connectors.

Each protection unit in the protection switching system is connectable to a corresponding line card where one line card is a standby line card.

The protection unit further comprises a switching element (e.g. an electrical relay) that in normal operation directs line signals between the communication line and the line card, but when protection switching is needed is adapted to direct the line signals between the communication line and the local bridge connector.

The protection unit connectable to the standby line interface unit is further provided with a by-pass element (e.g. a jumper) that by-passes the switching element in this protection unit.

The protection switching system is adapted so that when protection switching is needed (e.g. at failure of a line card) the line signal is re-directed between the communication line for the failed line card and the standby line card via the bridge connectors, the detachable electrical connection elements and the by-pass element.

The protection unit could for example be implemented as a separate printed board assembly connected to the corresponding line card via the backplane in the cabinet. The bridge connectors could for example be located in the front of the printed board assembly so that protection units easily can be connected to other protection units by manually inserting the detachable electrical connection elements (e.g. external jumpers or cables) in the bridge connectors.

One important advantage with the current invention is that different protection switching configurations (1+1 and N+1) can be used in the same sub-rack of a cabinet. Each configuration can have different types of line cards (E1, ADSL etc). Line cards with line signaling sensitive to bridge taps (such as the 2 Mb/s E1 line cards) can now be protected by easily configuring a 1+1 configuration.

Another advantage is that each protection unit can be produced as equal units as they can be connected to a arbitrary type of line cards such as a working E1 or ASDL line card or a standby E1 or ADSL line card. Equal protection units reduce the production and storing costs and the maintenance and other logistics involved are significantly simplified.

Yet another advantage is that no different design is needed for the standby line card compared to the working line card.

The objective with the current invention is therefore to allow for a very high degree of flexibility when configuring protection switching in telecommunication systems.

The invention will now be described in more detail and with preferred embodiments and referring to accompanying drawings.

BRIEF DESCRIPTION OF THE DRAWINGS

FIGS. 6a to 6c are block diagrams illustrating a number of embodiments of a protection unit according to the current invention.

DETAILED DESCRIPTION OF EMBODIMENTS

Figure 1:
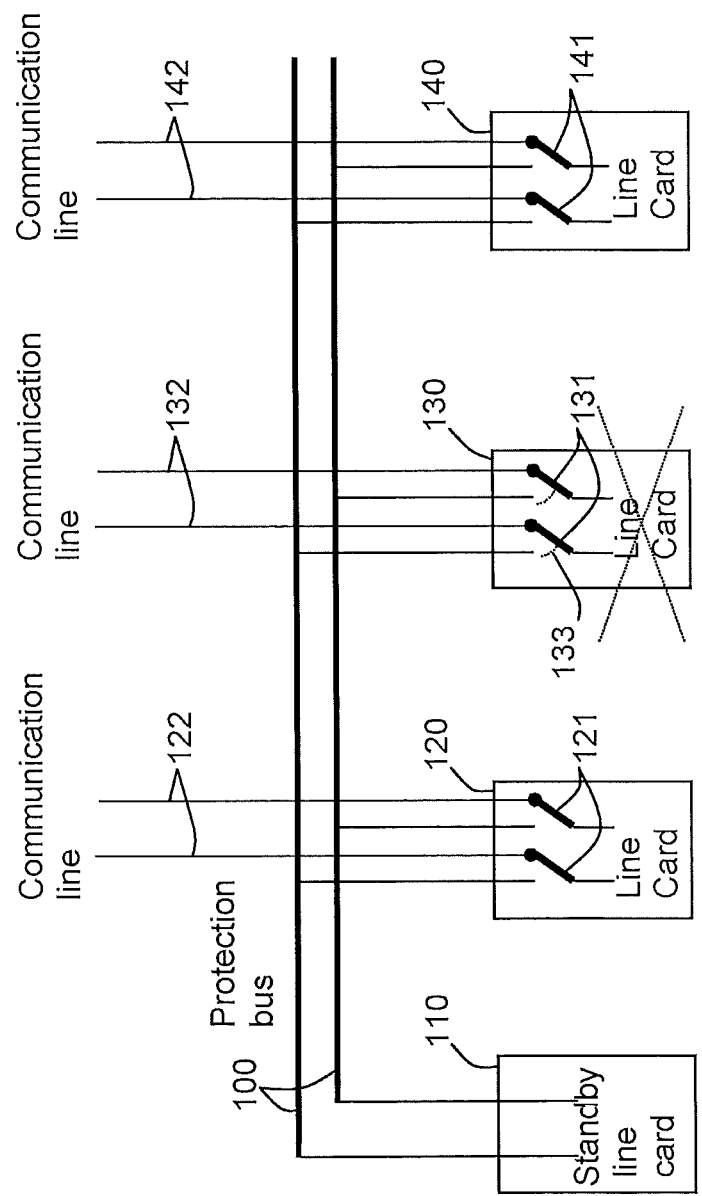
FIG. 1 is a block diagram illustrating a fixed protection bus known from prior art.

FIG. 1 illustrates a protection switching system known from prior art. Line cards 120,130,140 are connected to corresponding communication lines 122,132,142. The communications lines can for example be connected to customer premises equipment CPE, such as modems for digital subscriber lines DSL. Each line card 120,130,140 is also connectable to a protection bus 100. To the protection bus 100 is also connected a standby line card 110. Each line card 120, 130,140 also comprises a set of electrical relays 121,131,141. In normal operation the relays 121,131,141 are set so that line signals are directed between the communication lines 122, 132,142 and the corresponding line cards 120,130,140. But, if for example line card 130 fails, the relays 131 are switched in action 133 to a position so that the line signals are directed between the communication line 132 and the protection bus 100 instead. The standby line card 110 now takes over the processing of line signals from the communication line 132. In telecommunication systems like switches, routers etc the line cards 120,130,140 and the standby line card 110 are typically inserted in a cabinet (not shown in FIG. 1) having a backplane for feeding the cards with power etc. The protection bus 100 in FIG. 1 is a fixed bus located in said backplane. As the protection bus 100 is fixed, there is no flexibility for having several different protection switching configurations.

Figure 2:
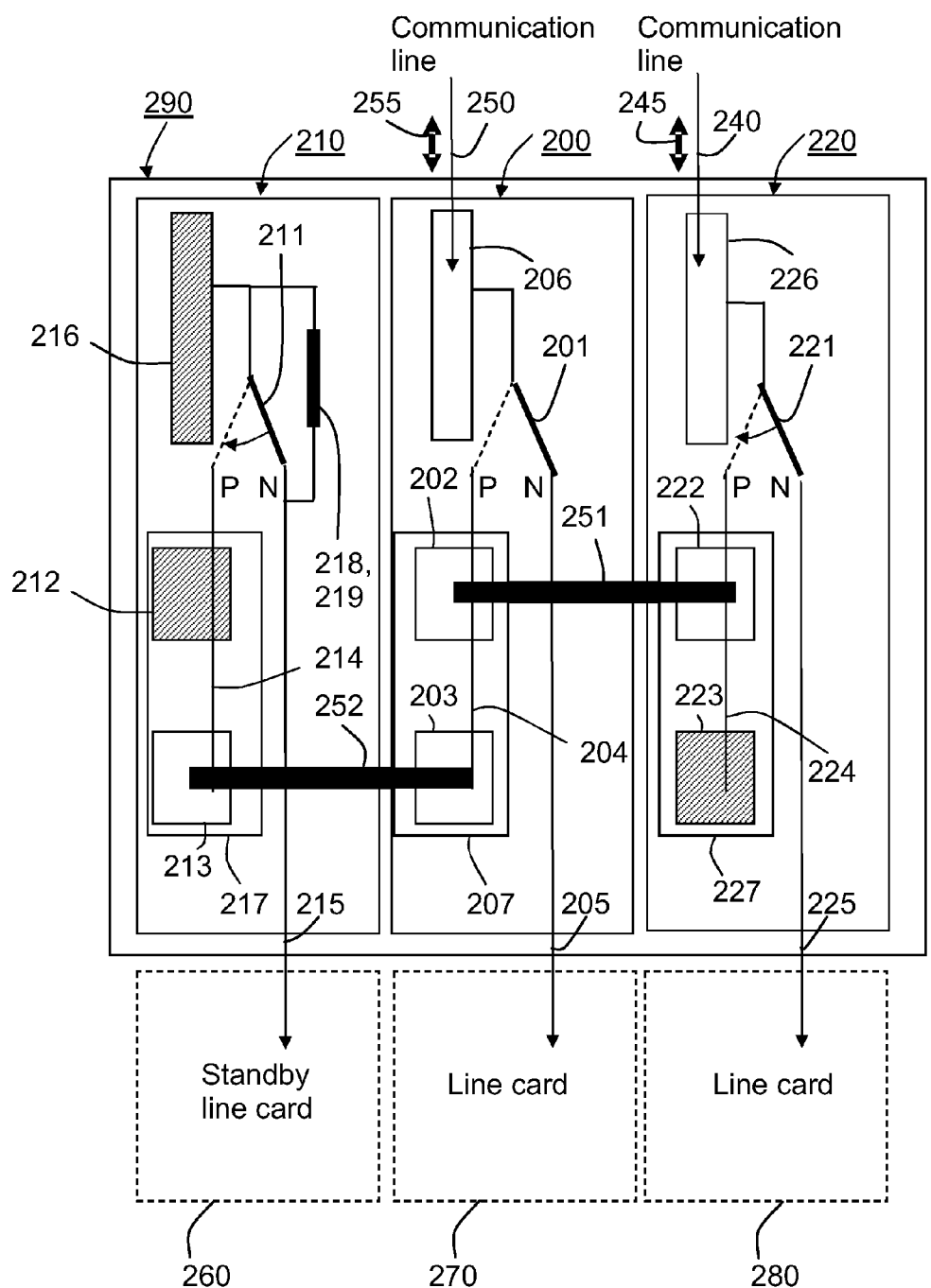
FIG. 2 is a block diagram illustrating three protection units according to the current invention.

FIG. 2 illustrates a protection system 290 comprising three protection units 200,210,220 according the current invention. The protection units 200,210,220 and the protection system 290 are located between communication lines 250,240 and line cards 260,270,280. Two protection units 200 and 220 are connected to the line cards 270 and 280 respectively. The third protection unit 210 is connected to a standby line card 260. The protection units 200 and 220 are connected to the communication lines 250, 240 via line connectors 206 and 226 respectively. The line connector 216 in the protection unit 210 is in this configuration not used (hatched in FIG. 2).

Each protection unit 200,210,220 further comprises a bridge connector 207,217,227. The bridge connectors 207, 217,227 in the different protection units 200,210,220 are designed to be connected to each other. Each bridge connector 207,217,227 is in the embodiment illustrated by FIG. 2 divided into a pair of separate bridge connectors 202,212,222 and 203,213,223 where each pair is electrically connected to each other 204,214,224. The bridge connectors 207,217,227 are preferably positioned in the front end of the protection units 200,210,220.

Each bridge connector 202,203,213 etc is designed to receive detachable electrical connection elements 251,252. These connection elements 251,252 are preferably sets of detachable jumpers or cables. Jumpers can for example be used for connecting two protection units located side-by-side as in FIG. 2 and cables can be used between protection units less adjacent to each other. Bridge connectors 212 and 223 (hatched in FIG. 2) are not used in this configuration. Not used connectors can be covered by a proper plastic or metallic lid.

In FIG. 2, bridge connector 222 in protection unit 220 is connected to bridge connector 202 in protection unit 200 by the detachable electrical connection element 251 and bridge connector 203 is connected to bridge connector 213 in protection unit 210 by the detachable electrical connection element 252.

The protection units 200,210,220 can be connected at 205, 215,225 to the line cards 270,280 and the standby line card 260 in different ways. Different embodiments on how to do this are described in more detail further below and illustrated by FIG. 6.

Each protection unit 200,210,220 also comprises a switching element 201,211,221 which in a preferred embodiment is a set of one or more relays.

The protection unit 210 that is connected to the standby line card 260 is further configured with a electrical by-pass element 218 and an identification element 219 which both could be implemented as detachable internal jumpers. The by-pass element 218 is designed to by-pass the switching element 211 and the identification element 219 is designed to identify (for example to a management system) that the protection unit 210 is connected to the standby line card 260. If the protection unit 210 is inserted in a backplane the identification can for example be performed by a read command from a slot management bus in the backplane. Likewise, the switching elements 201,211,221 can be controlled by switch commands from the same slot management bus.

In normal operation the switching elements 201,211,221 are set in a 'normal' position 'N'. This means that the line signals 255,245 are directed between the communication lines 250, 240 and the corresponding line card 270,280 and that the bridge connector 217 in protection unit 210 is electrically disconnected from the standby line card 260. If one line card, say line card 280 fails, the switching elements 221 and 211 are set in a 'protection switching' position 'P'.

This has the effect that the line signals 245 now are directed between the communication line 240 and the standby line card 260 via bridge connector 227, electrical connection elements 251 and 252 and the by-pass element 218.

By using the protection units 200,210,220 and detachable connection elements 251,252 between the bridge connectors 202,203,213,222 a very large flexibility to configure the protection switching system 290 is achieved. This is exemplified by the different configurations illustrated by FIGS. 3,4 and 5.

Figure 3:
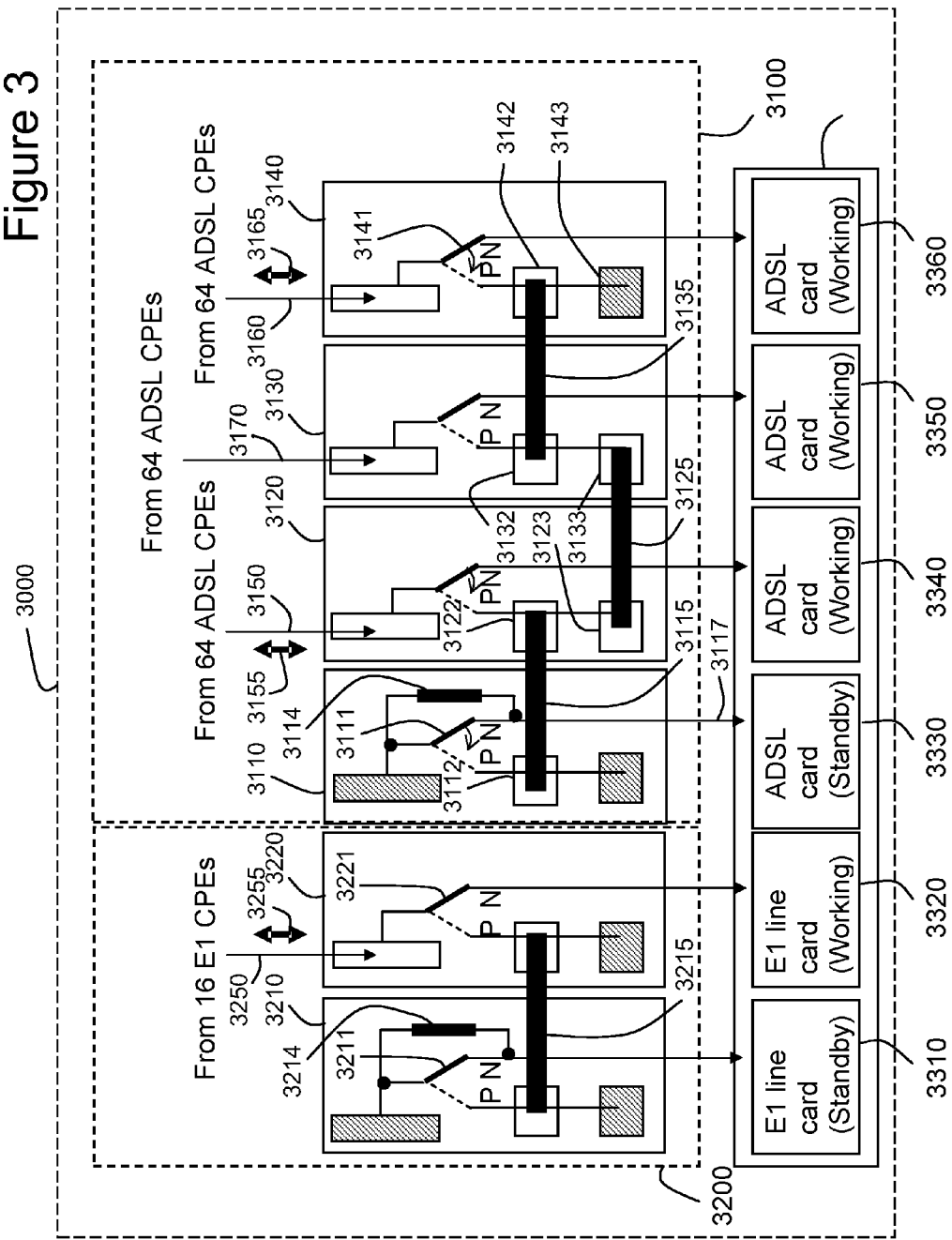
FIG. 3 is a block diagram illustrating a first configuration of a protection switching system according to the current invention.

FIG. 3 illustrates a telecommunication system 3000 having a configuration comprising two protection switching systems 3100,3200 and six line cards 3310,3320,3330,3340,3350,3360 all six line cards mounted in the same sub-rack 3300.

Protection switching system 3100 is a so called N+1 configuration and consists of four protection units 3110,3120, 3130,3140 each unit connected to a corresponding line card 3330,3340,3350,3360 respectively. The line cards 3330,3340,3350,3360 are ASDL line cards where one line card 3330 is a standby line card having a by-pass element 3114. The four protection units 3110,3120,3130,3140 are interconnected in series by using detachable electrical connection elements such as external jumpers 3115,3125,3135.

Protection switching system 3200 is a so called 1+1 configuration and consists of two protection units 3210,3220 each unit connected to a corresponding line card 3310,3320 respectively. The line cards 3310,3310 are E1 (2 Mb/s) line cards where line card 3310 is a standby line card having a by-pass element 3214. The two protection units 3210,3220 are interconnected in series by using an external jumper 3215.

In the configuration in FIG. 3 the two protection switching systems 3100 and 3200 can work independently and have different types of line cards. If for example the ADSL card 3360 fails, protection switching to the standby ADSL card 3330 is performed by setting the switching elements 3111 and 3141 into the 'protection switching' position 'P'. The line signals 3165 are now directed from communication line 3160 to the standby ADSL card 3330 via the detachable connection elements 3135,3125,3115 and the by-pass element 3114.

If also the E1 card 3320 fails, protection switching to the standby E1 3310 is performed in a similar way by setting the switching elements 3211 and 3221 into the 'protection switching' position 'P'. The line signals 3255 are now directed from communication line 3250 to the standby E1 card 3310 via the detachable connection element 3215 and the by-pass element 3214.

Apart from being independent, the two protection switching events are also performed without electrically interfering with each other. Moreover, line cards for line signals sensitive to bridge-taps such as the E1 line cards 3310,3320 can easily be configured in an 1+1 configuration with the external jumper 3215.

With a fixed and common protection bus as in FIG. 1 all this would not be possible.

As shown in FIG. 3, one ADSL card 3360 can be designed to serve a plurality of different ADSL communication lines 3160 (here 64 lines). The protection unit 3140 is therefore adapted to serve as many communication lines 3160 as the line card 3360 can serve and has for example a bridge connector 3142 for each communication line 3160. This means that the detachable electrical connection element 3135 connected between the bridge connectors 3132 and 3142 also must support a plurality of different communication lines. To achieve this, equivalent electrical connection elements here called jumper subunits 715,725,735 comprising a set of jumpers are used.

Figure 7A:
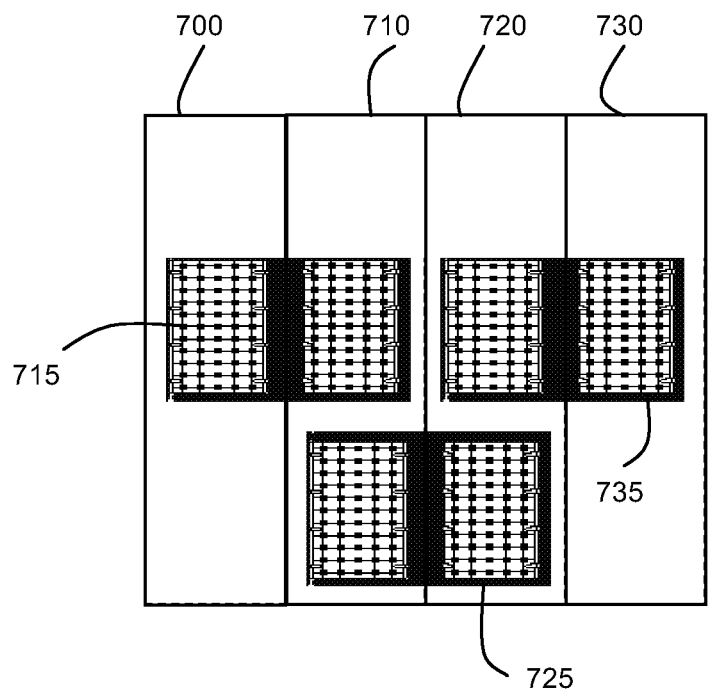
FIG. 7a is a block diagram illustrating protection units interconnected by jumper sub-units.

These jumper subunits 715,725,735 are illustrated in FIG. 7a. Each jumper subunit 715,725,735 is mounted on two adjacent (side-by-side) protection units 700,710,720,730.

When only using the jumper subunits 715,725,735 it is required that the protection units 700,710,720,730 are grouped together side-by-side (as done in the protection systems 3100, 3200 in FIG. 3).

Figure 7B:
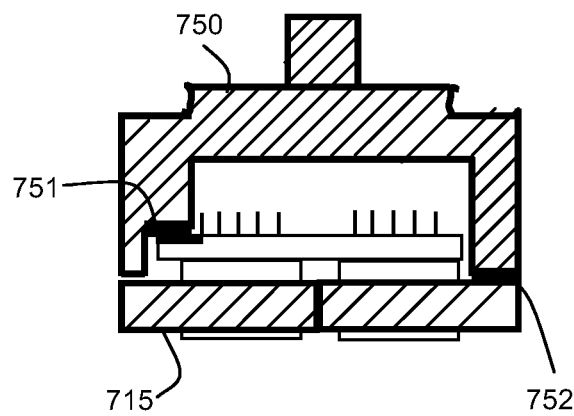
FIG. 7b is a block diagram illustrating a jumper subunit metallic cover for reduced EMI/EMC.

As an option, the front of the jumper subunits 715,725,735 are covered by metallic screens for improved EMI/EMC. FIG. 7b shows the jumper unit 715 covered by a metallic screen 750. For grounding, the metallic screen 750 is provided with gaskets 751 and 752.

Occasionally, line card configurations have to be modified.

Figure 4:
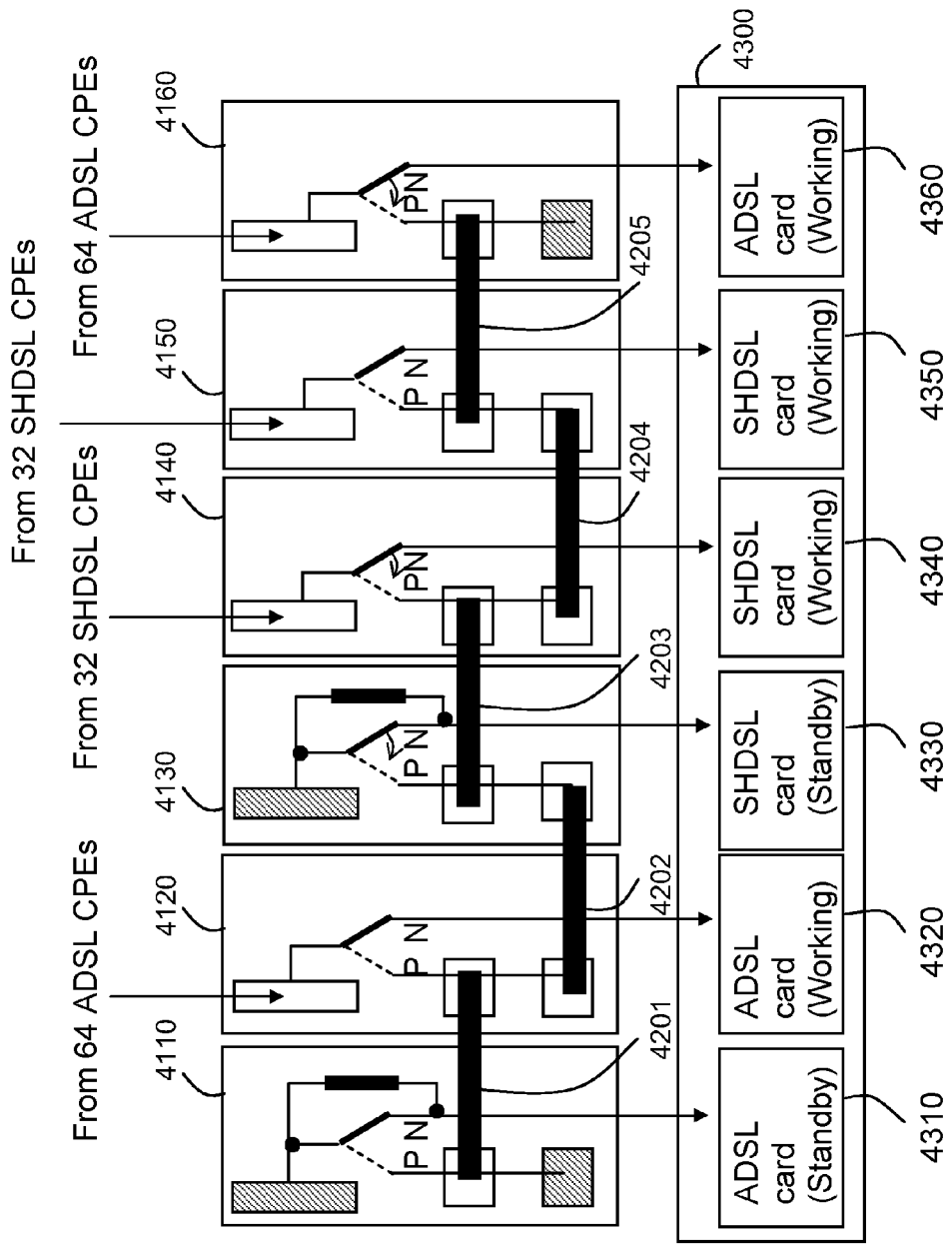
FIG. 4 is a block diagram illustrating a second configuration of a protection switching system according to the current invention.

It could for example be necessary to add line new cards to an existing configuration. FIG. 4 illustrates such a situation.

Two ADSL line cards 4310, 4320 and three SHDSL line cards 4330,4340,4350 have been inserted in two groups in a sub-rack 4300. Each line card is connected to a corresponding protection unit 4110,4120,4130,4140,4150. Line cards 4310 and 4330 are standby line cards. The protection units 4110, 4120 for the ADSL line cards 4310, 4320 are interconnected with a jumper sub-unit 4201 and the protection units 4130, 4140,4150 for the SHDSL line cards 4330,4340,4350 are interconnected with jumper sub-units 4203,4204.

Customer demands may require that a new ADSL line card 4360 has to be installed. This new ADSL line card 4360 has to be inserted somewhat distant from the group of other ADSL line cards 4310,4320. The new ADSL line card 4360 is connected to a corresponding protection unit 4160.

In this situation, it is possible to simply add two new jumper sub-units 4202 and 4205 between the protection units 4120,4130 and 4150,4160 respectively.

Both the group of ADSL line cards 4320,4360 and the group of SDHSL cards 4340,4350 now have protection by the standby line cards 4310 and 4330 respectively, but with the limitation that both groups can not be protected simultaneously. To overcome this limitation, the jumper sub-units can be replaced with jumper cables where necessary. A configuration illustrating this is found in FIG. 5.

Figure 5:
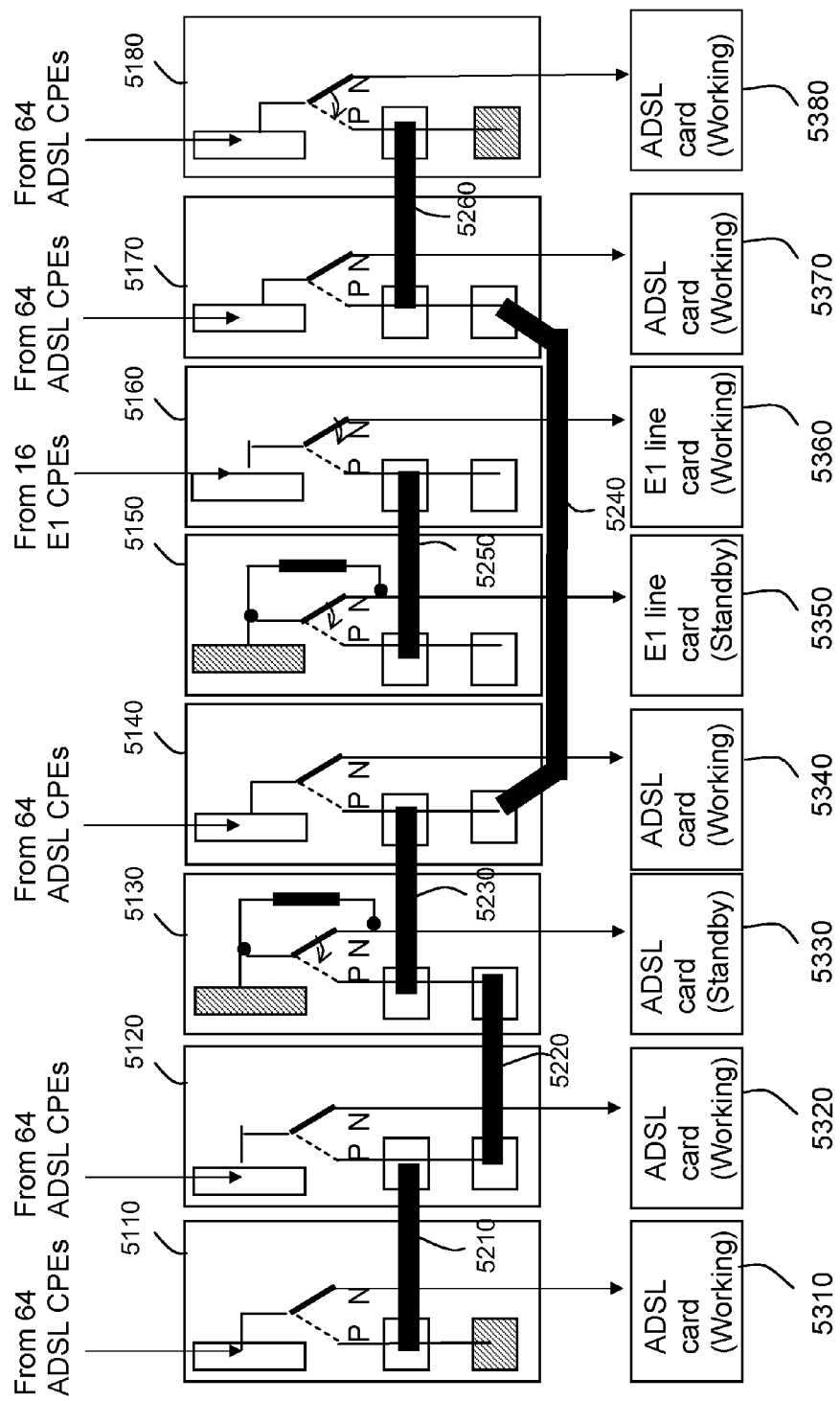
FIG. 5 is a block diagram illustrating a third configuration of a protection switching system according to the current invention.

In FIG. 5, three ADSL line cards 5310, 5320, 5340 and an ADSL standby line card 5330 were originally installed together with corresponding protection units 5110,5120, 5140,5130. The protection units 5110, 5120, 5140, 5130 are interconnected by three jumper sub-units 5210, 5220 and 5230. In addition, an E1 line card 5360 and an E1 standby line card 5350 is installed together with corresponding protection units 5150,5160. Two new ADSL line cards 5370,5380 are installed together with two corresponding protection units 5170,5180. The two new ADSL line cards 5378,5380 are interconnected by a jumper sub-unit 5260. As E1 line signaling is very sensitive to bridge taps, a serial connection of jumper sub-units as shown in FIG. 4 is not accepted. Instead, a jumper cable 5240 is connected between protection units 5140 and 5170 by-passing the E1 line cards 5350,5360. By this, the ADSL line cards 5310,5320,5340,5370,5380 can be protected independently of the protection for the E1 line card 5360 and no bridge taps are introduced for the E1 line card 5360.

A preferred embodiment on how to connect the protection switching units to the line cards is illustrated by FIG. 6a. FIG. 6a illustrates a telecommunication system 600 with a protection unit 610 that is separated from the corresponding line card 613. The communication line 602 is connected to the protection unit 610 by a line connector 601. The protection unit 610 and the corresponding line card 613 are connected to each other via an interface connector 611 on the protection unit 610 and a backplane 612 in the telecommunication system 600. In the front end 605 of the protection unit 610, the line connector 601 and bridge connectors 603,604 are located.

FIG. 6b illustrates a second embodiment. In this embodiment the protection unit 620 is mounted (piggybacked) in the front of the line card 623 by an interface connector 621. As in the preferred embodiment in FIG. 6a, the line connector 601 and the bridge connectors 603,604 are located in the front end 605 of the protection unit 620.

FIG. 6c illustrates a third embodiment where the protection unit 630 forms an integrated unit 607 with the line card 633. As in the embodiments in FIGS. 6a and 6b the line connector 601 and the bridge connectors 603,604 are located in the front end 605 of the integrated unit 607.

The protection switching units and system described above are primarily conceived to cope with protection switching when line cards fail. Adding a few additional elements to at least one of the protection units in the system, the protection switching systems described above and illustrated by FIGS. 2 to 5 can also serve as an aid for testing the communication lines.

Figure 8:
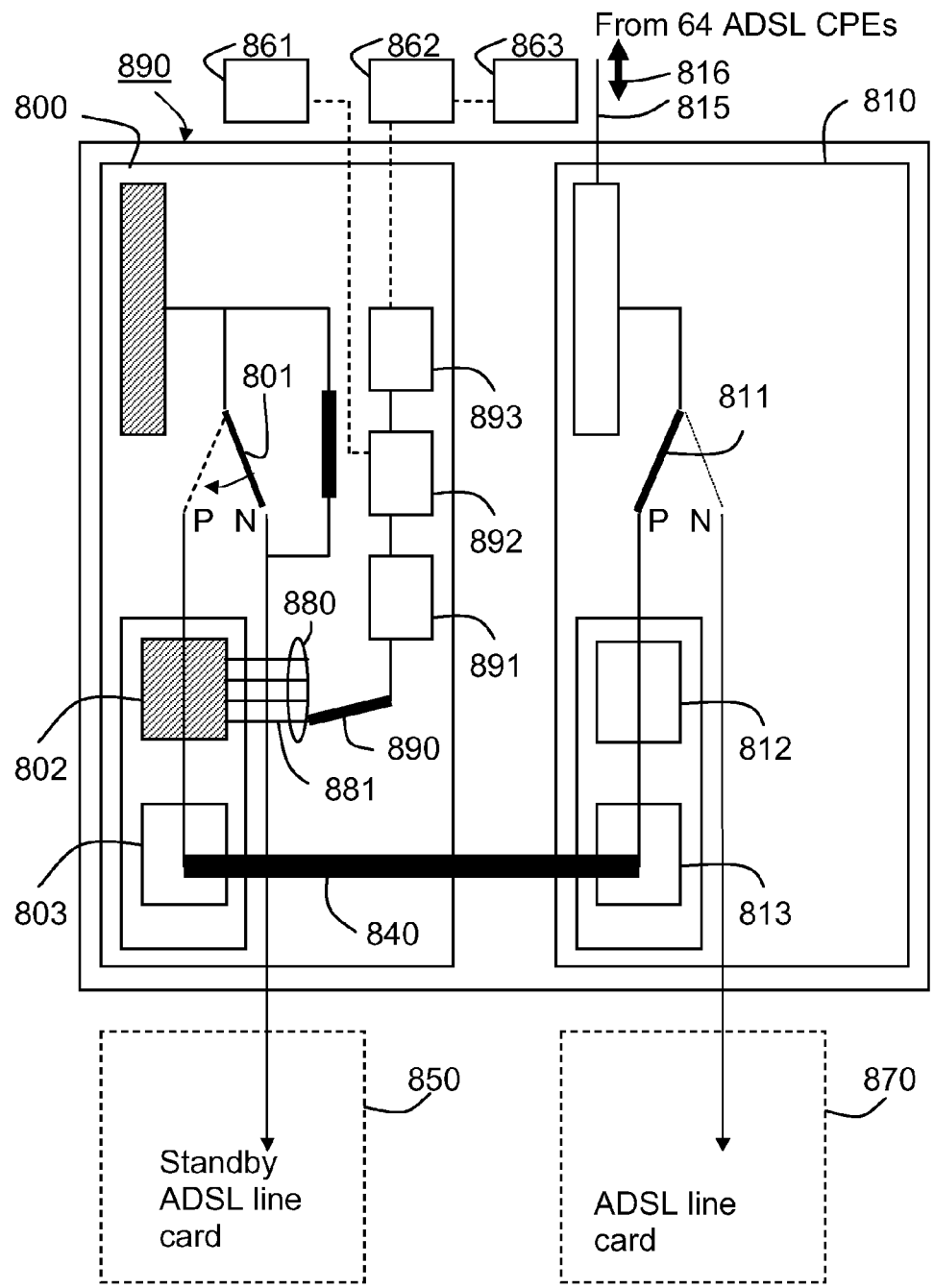
FIG. 8 is a block diagram illustrating a protection system adapted for testing communication lines.

FIG. 8 illustrates an example of a protection system 890 having the additional testing features and serving 64 ADSL lines. For illustrative purposes the protection system 890 is limited in FIG. 8 to two protection units 800,810.

Protection unit 810 is connected to the 64 line ADSL lines 815 and a 64 line ADSL line card 870. Protection unit 800 is connected to a standby 64 line ADSL line card 850. The bridge connectors 803 and 813 in protection units 800 and 810 respectively are interconnected with a jumper subunit 840 (equal to any of the jumper subunits 715,725,735 described above and illustrated by FIG. 7a) or a jumper cable if necessary.

Protection unit 800 is designed with an on board test head 891 and/or at least one test head connector 892,893. The test head connectors 892,893 allow external test heads 861 or other test or telecommunication equipment 862,863 to be connected to the protection unit 800. The other telecommunication equipment 862,863 can for example be multiple sub-racks having protection switching systems according to the current invention connected in a daisy chain. By this daisy-chain, a single test equipment can be used for testing communication lines in several protection switching systems.

The test head 891 and test head connectors 892,893 are preferably mounted in the front end of the protection unit 800. Bridge connector 802 in protection unit 800 is designed with line taps 880 so that all the 64 ADSL lines are available to a test head switch element 890 which in turn is connected to the test head 891 and/or test head connectors 892,893. The test head switch element 890 is designed to select one arbitrary line tap 881 out of the 64 line taps 880.

For testing a selected line (a 'line under test') out of the 64 ADSL lines 815 connected to the protection unit 810, at least three test configurations are possible. In a first test configuration, switching element 811 in protection unit 810 is set in a 'protection switching' position 'P' for the selected line only and for the remaining 63 communication lines the switching element 811 is set to the 'normal' position 'N'.

The line signal 816 in the selected line is further directed to bridge connector 802 in protection unit 800 via the bridge connectors 813,803 and the jumper subunit 840. The switch element 801 in protection unit 800 is set to the 'normal' position 'N' so that the standby line card 850 is not involved. The test head switch element 890 in protection unit 800 is further set to a position so that it is connected to the line tap 881 corresponding to the line that has been selected. The line signals 816 for the selected line is now directed to the test head 891 and/or the test head connectors 892,893. By setting the switch elements 811,801 and the test head switch element 890 in certain positions, each of the 64 ADSL lines 815 connected to protection unit 810 are available for testing one by one. In this first test configuration, the line under test is disconnected from the line card 870 and the standby line card 850.

In a second test configuration, the line signals 816 for all communication lines 815 are directed to the standby line card 850. Switching element 811 in protection unit 810 is set in a 'protection switching' position 'P' for all the 64 ADSL lines 815. The switch element 801 in protection unit 800 is also set to the 'protection switching' position 'P' for all the 64 ADSL lines 815. The line under test is selected by the test head switch element 890 in the same way as for the first test configuration. The main difference from the first test configuration is that in the second test configuration the line under test is still connected to a line card (in this case the standby line card 850).

A third test configuration is similar to the second test configuration but where the line under test is disconnected from the standby line card 850. This is achieved by setting switching element 801 in protection unit 800 in the 'normal' position 'N' only for the line under test.

The invention claimed is:

1. A protection unit for providing protection switching in a telecommunication system, comprising:
    a local bridge connector configured to receive at least one detachable electrical connection element;
    a switching element that is configured to electrically disconnect a line interface unit from the local bridge connector in normal operation mode position; and
    a detachable by-pass element that is connected in series between the switching element and the line interface unit to electrically connect the line interface unit to the local bridge connector through the switching element when the switching element is in a protection operation mode position;
    wherein the protection unit is comprised in a printed board assembly having the local bridge connector disposed at an end thereof; and
    wherein the detachable by-pass element has a first end connected to the switching element and a second end connected to the line interface unit such that the first and second ends are disposed on the printed board assembly.

2. The protection unit as in claim 1, further comprising a detachable identification element configured to indicate when the line interface unit is a stand-by line interface unit.

3. The protection unit as in claim 2, wherein the identification element is readable from a management system.

4. The protection unit as in claim 1, further comprising an interface connector configured to interface the line signals to and from the line interface unit.

5. The protection unit as in claim 4, where the interface connector is connectable to the line interface unit.

6. The protection unit as in claim 4, wherein the interface connector is configured to attach directly to the line interface unit.

7. The protection unit as in claim 1, wherein the protection unit is integrated with the line interface unit on the printed board assembly.

8. The protection unit as in claim 1, wherein the switching element comprises at least one electrical relay.

9. A system for protection switching in a telecommunication system, comprising:
    a first protection unit comprising:
        a first local bridge connector; and
        a first switching element that is configured to direct first line signals between a first communication line and a first line interface unit in normal operation and to direct the first line signals between the first communication line and the first local bridge connector when protection switching is needed; and
    a second protection unit comprising:
        a second local bridge connector;
        a by-pass element; and
        a second switching element that is configured to direct the first line signals between the first communication line and a stand-by line interface unit through the second local bridge connector and the by-pass element when protection switching is needed and to disconnect the stand-by line interface unit from the second local bridge connector in normal operation;
    wherein the by-pass element is connected in series between the second switching element and the stand-by line interface unit when protection switching is needed, the by-pass element having a first end connected to the second switching element and a second end connected to the stand-by line interface unit such that the first and second ends are disposed on the second protection unit;
    wherein the first and second local bridge connectors are electrically connected to each other via detachable electrical connection elements.

10. The system as in claim 9, wherein the detachable electrical connection elements comprise external jumpers.

11. The system as in claim 9, wherein the detachable electrical connection elements comprise external jumper cables.

\* \* \* \* \*

UNITED STATES PATENT AND TRADEMARK OFFICE
CERTIFICATE OF CORRECTION

| | |
|---|---|
| PATENT NO. | : 8,780,695 B2 |
| APPLICATION NO. | : 13/125614 |
| DATED | : July 15, 2014 |
| INVENTOR(S) | : Grosso |

It is certified that error appears in the above-identified patent and that said Letters Patent is hereby corrected as shown below:

In the Specification

In Column 4, Line 62, delete "line cards 3310,3310" and insert -- line cards 3310,3320 --, therefor.

In Column 6, Line 17, delete "line cards 5378,5380" and insert -- line cards 5370,5380 --, therefor.

Signed and Sealed this
Twelfth Day of May, 2015

Michelle K. Lee
*Director of the United States Patent and Trademark Office*